(12) United States Patent
Chopard et al.

(10) Patent No.: US 11,248,516 B2
(45) Date of Patent: Feb. 15, 2022

(54) COOLING CIRCUIT AND METHOD ON A VEHICLE

(71) Applicant: Hutchinson, Paris (FR)

(72) Inventors: Fabrice Chopard, Paris (FR); Christophe Dominiak, Paris (FR)

(73) Assignee: Hutchinson, Paris (FR)

( * ) Notice: Subject to any disclaimer, the term of this patent is extended or adjusted under 35 U.S.C. 154(b) by 307 days.

(21) Appl. No.: 15/753,774

(22) PCT Filed: Aug. 19, 2016

(86) PCT No.: PCT/FR2016/052096
§ 371 (c)(1),
(2) Date: Feb. 20, 2018

(87) PCT Pub. No.: WO2017/029459
PCT Pub. Date: Feb. 23, 2017

(65) Prior Publication Data
US 2018/0291798 A1 Oct. 11, 2018

(30) Foreign Application Priority Data
Aug. 20, 2015 (FR) ........................................ 1557840

(51) Int. Cl.
*F01P 3/20* (2006.01)
*F28D 20/02* (2006.01)
(Continued)

(52) U.S. Cl.
CPC ................... *F01P 7/16* (2013.01); *F01P 3/20* (2013.01); *F28D 20/023* (2013.01);
(Continued)

(58) Field of Classification Search
CPC ....... F24F 5/0021; B60H 1/00492; F01P 3/20; F01P 7/16; F28D 20/023
(Continued)

(56) References Cited

U.S. PATENT DOCUMENTS 5,211,334 A * 5/1993 Schatz ............... B60H 1/00492
126/617
5,765,511 A * 6/1998 Schatz ............... B60H 1/00492
123/41.14
(Continued)

FOREIGN PATENT DOCUMENTS

DE 2930269 A * 3/1981
DE 195 35 027 A1 3/1997
(Continued)

OTHER PUBLICATIONS

Translation of German Patent Document DE2930269A entitled Translation-DE2930269A (Year: 2021).*

*Primary Examiner* — Paul Alvare
(74) *Attorney, Agent, or Firm* — Blank Rome LLP (57) ABSTRACT

A cooling circuit comprising a liquid circulation path and arranged on the path:
in series, an engine and a radiator, mounted on a first branch in parallel between the inlet and outlet of the radiator, a store-exchanger containing at least one volume:
enclosing elements for storing and releasing thermal energy, involving a phase change material PCM, placed in a heat exchange relationship with said liquid,
and around which are arranged at least one first layer containing a PCM and one second layer containing a porous thermally insulating material,
and valves so positioned as to direct the circulation of the liquid arriving from the engine toward the radiator and/or the store-exchanger.

8 Claims, 7 Drawing Sheets

(51) Int. Cl.
  *F01P 7/14*    (2006.01)
  *B60K 11/02*   (2006.01)
  *F01P 7/16*    (2006.01)
  *F01P 11/20*   (2006.01)
  *F01P 11/14*   (2006.01)
  *F28D 20/00*   (2006.01)

(52) U.S. Cl.
  CPC ......... *F28D 20/026* (2013.01); *F28D 20/028* (2013.01); *B60K 11/02* (2013.01); *F01P 11/14* (2013.01); *F01P 2007/146* (2013.01); *F01P 2011/205* (2013.01); *F28D 2020/0008* (2013.01); *F28D 2020/0021* (2013.01); *F28D 2020/0069* (2013.01); *Y02E 60/14* (2013.01)

(58) Field of Classification Search
  USPC .......................................................... 62/239
  See application file for complete search history.

(56) References Cited

U.S. PATENT DOCUMENTS

| | | | | |
|---|---|---|---|---|
| 5,927,381 | A * | 7/1999 | Bednarek | F28D 20/02 165/41 |
| 6,032,869 | A * | 3/2000 | Ito | B60H 1/00314 165/103 |
| 6,059,016 | A * | 5/2000 | Rafalovich | B60H 1/00492 165/10 |
| 6,178,929 | B1 * | 1/2001 | Schatz | B60H 1/00492 123/142.5 R |
| 6,564,757 | B2 * | 5/2003 | Suzuki | B60H 1/00492 123/41.14 |
| 6,769,623 | B2 * | 8/2004 | Ban | B60H 1/00492 237/12.3 B |
| 6,772,823 | B2 * | 8/2004 | Hirano | F28D 20/0056 165/10 |
| 7,216,697 | B2 * | 5/2007 | Odeskog | B60H 1/00314 165/202 |
| 8,006,655 | B2 * | 8/2011 | Hiyama | B60H 1/00314 123/41.14 |
| 8,613,305 | B2 * | 12/2013 | Yu | B60H 1/00492 165/47 |
| 8,863,702 | B2 * | 10/2014 | Schatz | F28D 20/0034 123/41.44 |
| 9,429,350 | B2 * | 8/2016 | Chapman, Jr. | F25D 3/08 |
| 9,821,630 | B2 * | 11/2017 | Goenka | F25D 16/00 |
| 10,471,803 | B2 * | 11/2019 | Bidner | B60H 1/00885 |
| 2004/0055320 | A1 * | 3/2004 | Horstmann | F25B 9/008 62/244 |
| 2005/0167079 | A1 * | 8/2005 | Zhang | F28D 20/028 165/10 |
| 2005/0167169 | A1 * | 8/2005 | Gering | F01P 3/20 237/12.3 B |
| 2010/0186924 | A1 * | 7/2010 | Hiyama | F01P 7/165 165/10 |
| 2011/0147391 | A1 * | 6/2011 | Corder | F28D 20/02 220/592.27 |
| 2012/0196040 | A1 * | 8/2012 | Wilk, Jr. | C04B 41/61 427/294 |
| 2012/0227926 | A1 * | 9/2012 | Field | F28D 20/02 165/10 |
| 2013/0062355 | A1 * | 3/2013 | Shulman | B65D 75/002 220/592.01 |
| 2013/0221013 | A1 | 8/2013 | Kolowich et al. | |
| 2014/0097261 | A1 * | 4/2014 | Blumenstock | B60H 1/00492 237/5 |
| 2014/0331946 | A1 * | 11/2014 | Eilemann | F01P 11/08 123/41.14 |
| 2015/0239639 | A1 * | 8/2015 | Wenner | B65B 11/585 206/386 |

FOREIGN PATENT DOCUMENTS

| | | |
|---|---|---|
| WO | WO-95/29057 | 11/1995 |
| WO | WO-97/47937 | 12/1997 |
| WO | WO-2010/132726 A1 | 11/2010 |

* cited by examiner

COOLING CIRCUIT AND METHOD ON A VEHICLE

This application is a national stage of International Application No. PCT/FR2016/052096, filed Aug. 19, 2016, which claims the benefit of French Patent Application 1557840, filed Aug. 20, 2015, the contents of each of which are incorporated herein by reference.

The present invention relates to the circulation of a heat transfer fluid in a vehicle cooling circuit.

A temperature management system on a vehicle cooling circuit using a heat transfer liquid is known from DE 1953502, the circuit comprising a liquid circulation path and where the following are arranged on the path:

in series, a means for circulating the liquid along the path, an engine for moving the vehicle, whose components are to be placed in a heat exchange relationship with the liquid, and a heat exchanger having an inlet and an outlet for said liquid in order to place this liquid in a heat exchange relationship with another fluid within the exchanger, connected (i.e. mounted on a first branch) between the inlet and the outlet of the heat exchanger, a heat store into which said liquid can enter and from which it can exit, and valves so positioned that liquid arriving from the engine flows toward the heat exchanger and/or the heat store.

However, in DE 1953502, the heat store is in particular to be used to recover the sensible heat for the purpose of heating the engines of vehicles in order to reduce exhaust emissions, the cost of thermal storage for the sensible heat being presented as favourable and the heat transfer fluids for latent heat storage presented as aggressive, if not dangerous, in the cooling circuit of an engine.

Yet, the goals pursued here concern the following:

high energy performance (quick storage of thermal energy preferably available after about 5 to 20 minutes, retaining this energy for 6 to 15 hours, before quickly releasing it, typically within a few minutes (in particular within less than 2 to 3 min)), volumes (space requirements) and/or limited weights, assemblies and operating cycles that are reliable, easy to execute, install and maintain over time, used to favourably cope with critical situations that may be encountered by these vehicles, reliable manufacturing, installation and operating costs that are compatible with mass production (as in the automotive sector).

It is in this context that what is proposed here, unlike in DE 1953502, is that, in the system introduced above, the heat store is a latent heat storage and thermal energy release unit (hereinafter "the unit"), containing at least one volume:

enclosing elements including phase change material (PCM) for storing and releasing the thermal energy contained in said liquid in view of a heat exchange with this liquid, and around which is installed a thermal barrier comprising at least one first layer containing a PCM and which is surrounded by a second layer containing a porous thermally insulating material to thermally isolate said volume from the outside.

The thermal performance related to the use of the latent heat and that of the heat management and protecting thermal barrier will thus be combined.

To optimize the use of latent heat in said unit, it is favourably proposed that at least some of said PCM elements have a melting temperature that is less than or equal to the melting temperature of the PCM of said first layer.

As will have been understood, while the unit's said PCM elements will be in a heat exchange relationship with said liquid that will circulate in their midst, the PCM that surrounds the overall volume containing them will not be in contact with the liquid. It will, of course, be sensitive to the thermal exchanges occurring within the volume, in order to store or release thermal energy according to the temperature of the liquid circulating in the midst of the unit's said PCM elements. As for the second layer containing the thermally insulating material, it will preserve the inside of the unit from the outer ambient conditions and thus promote the best desired use of the latent heat.

It is specified that a phase change material (or PCM) will designate any material capable of changing its physical state within a restricted temperature range. Thermal storage is carried out by using its Latent Heat: the material can then store or release energy by a mere change of state, while maintaining a substantially constant temperature, that of the change of state.

Moreover, the "vehicles" mentioned above will be those moved by the aforementioned engines, in particular in the automotive (cars, lorries, etc.), aeronautical and maritime (surface ships, submarines, various buoyant apparatuses, etc.) sectors.

This has the consequence that the above term exchanger includes both of the following:

a car or aircraft radiator generally a fluid (air)-liquid (glycol water) exchanger, a liquid-liquid exchanger as on marine structures, such as boats, where the radiator will typically be a liquid (seawater)-liquid (freshwater) exchanger.

The circuit can be assembled in two ways. However, it is proposed that in all cases, said valves of the circuit are so positioned therein as to:

in nominal mode, said liquid arriving from the engine can:
  flow through the heat exchanger without flowing through the unit,
  then return to the engine, when said PCM elements of the unit are in a calorie-charging state (or mode), any liquid arriving from the engine can at least partly flow through said unit and through the heat exchanger and then return to the engine, or even that, when the unit's said PCM elements are in a calorie-discharging state (or mode), liquid arriving from the engine can:
  flow through the unit without flowing through the heat exchanger,
  then return to the engine.

Latent heat can thus conveniently be stored (charging state) and then released (discharging state), except in a state that does not allow it (nominal mode of the circuit).

It being specified that in the first assembly (called "in series"), it is proposed that the valves preferably comprise the following:

a first three-way valve so positioned as to circulate the liquid either toward the heat exchanger or toward said unit, a second two-way valve so positioned as to allow the liquid to circulate in the heat exchanger when it is open and prevent it from circulating therein when it is closed, and a third two-way valve so positioned as to:
  when the unit is in said calorie-charging state (mode), circulate any liquid coming from the engine into the unit by closing any return to the engine thus bypassing the heat exchanger,
  and, when the unit is in said calorie-discharging state (mode), circulate any liquid coming from the unit toward the engine.

Advantageously, the preferred operation will then be the following:
in nominal mode, liquid having exited the engine will flow through the first valve and then entirely through the exchanger, without flowing through the unit, the second valve being open and the third valve being closed,
when the unit is in the calorie-charging state, liquid having exited the engine will flow through the first valve, which will direct all of it toward the unit, after which the liquid will flow through the heat exchanger and then return to the engine, the second valve being open and the third valve being closed,
and, when the unit is in a calorie-discharging state, the liquid will flow through the first valve and then entirely into the unit and then return to the engine, the second valve being closed and the third valve being open.

A disadvantage of this simple, easy-to-implement and effective solution is that it does not handle states (modes) in which the radiator is under an excessive thermal load, when it would be necessary to cancel out a temperature peak in the radiator.

The second assembly (called "in parallel"), as described below, does allow this when:
the valves comprise a first three-way valve and second, third and fourth two-way valves,
the connection of the unit to the outlet of the heat exchanger is located downstream, with respect to the circulation of the liquid, of a second branch of the circulation path which:
  is connected to the first valve, which is so positioned as to share the flow of liquid coming from the engine between the heat exchanger and said second branch,
  and opens downstream of the heat exchanger to allow for it to be bypassed when the first valve is closed toward the heat exchanger and open toward the second branch,
with respect to the circulation of the liquid, the connection of the unit toward the inlet of the heat exchanger is located upstream of the first valve and includes the second valve so positioned on the first branch as to:
  when it is in the open state, allow the liquid to circulate into the unit, when the first valve is in an open state,
  and, when it is in the closed state, prevent any liquid coming out of the unit from returning to the first valve,
a third branch of the circulation path includes the third valve and is connected between the second valve and said unit on the first branch,
and, when the third valve is in a closed state and the second valve is in an open state and when the unit is in a calorie-charging state, the first branch allows for the liquid coming out of the second valve to be circulated toward the unit, the third valve preventing, in a closed state, any liquid from returning toward the engine through said third branch without flowing through the unit and, when it is in an open state, allowing liquid to return to the engine, when the fourth valve is closed, the fourth valve being so positioned as to:
  when it is in the open state, allow the liquid to return in this way after its passage through the unit, when said unit is in the calorie-charging state,
  and, with it is in the closed state, prevent the liquid coming from the third branch from returning to the heat exchanger.

Advantageously, the preferred operation will then be the following:
in nominal mode, liquid having exited the engine flows through the first valve and then through the heat exchanger, without flowing into the unit nor flowing through the second and third valves, which are then closed, the fourth valve being open,
when the unit is in a calorie-charging state, liquid having exited the engine at least partly flows through the second valve, which directs it toward the unit, whereas passage through the first valve toward the heat exchanger and into the second branch is adjusted according to at least one physical parameter in the unit or in the heat exchanger, after which the liquid returns to the engine, the fourth valve being open and the third valve being closed,
when the unit is in a calorie-discharging state, liquid having exited the engine flows through the first valve, which directs it exclusively toward the unit through the second branch, without flowing through the heat exchanger, the fourth valve being closed, after which the liquid returns to the engine, the second valve being closed and the third valve being open.

The operation that is then possible in "radiator under excessive thermal load" mode is described further below.

From the foregoing it will have been understood that the aforementioned unit for storing and then releasing thermal energy will allow for the thermal management of the fluid and even of the circuit as a whole, all the more so if a potential thermal overload of the radiator can be controlled.

To globalise the aforementioned said preferred modes of operation related to the two invented assemblies in particular, it is furthermore proposed here to thus manage the temperature on a vehicle cooling circuit comprising a path for circulating a heat transfer liquid and where the following are arranged along the path:
a means for circulating the liquid along the path,
an engine for moving the vehicle whose components are to be placed in a heat exchange relationship with the liquid,
a heat exchanger having an inlet and an outlet for said liquid in order to place it in a heat exchange relationship with another fluid,
before the inlet to the exchanger, a latent heat storage and thermal energy release unit into which said liquid can enter and from which it can exit, and which contains at least one volume:
  enclosing elements including phase change material for storing and releasing the thermal energy contained in said liquid and placed for this purpose in a heat exchange relationship with this liquid,
  and around which is installed a thermal barrier comprising at least one first layer containing a PCM and one second layer containing a porous thermally insulating material to thermally isolate the unit from the outside.
and valves so positioned that liquid arriving from the engine flows toward the heat exchanger and/or the thermal energy storage and release unit in such a way that:
in nominal mode, liquid having exited the engine flows through the heat exchanger, without said liquid flowing through the unit,
and, when the unit is in a state where calories are charged through said PCM elements, liquid having exited the engine flows through the unit, after which it flows through the heat exchanger and then returns to the engine.

The ability to recover latent heat from the liquid having gone through the engine will thus be optimized.

As explained in connection with the first assembly, after said calorie-charging state has been established in the circuit, it will also be possible to established a state in it in which calories are discharged from the unit's PCM elements, by making all of the liquid having exited the engine flow through said unit, and then making said liquid return to the engine, which would in this case complement the aforementioned advantages.

Concerning the internal execution of the unit, the inventors have also sought to apply complementary solutions they have defined: high energy performance, limited space requirement and/or weight, reliable assemblies and operating cycles that are easy to execute, install and maintain over time, and cost-efficient manufacturing, installation, and operation.

Moreover, although their physical principles seem useful, PCMs, just as insulating materials (porous if there is an air gap to achieve), do not seem to meet market expectations in their current implementations.

Also, it is advised that all or part of the following be observed:

a) said volume of the unit is provided with baffles to make the liquid meander;
b) at least the second layer containing the thermally insulating material is contained in an enclosure that is impervious to said material and to air so that, an air gap being established in said enclosure, a vacuum insulation panel (VIP) is formed;
c) the volume or each volume is limited laterally by a peripheral wall having a mouldable polymer material and the first and second layers are integrated with said polymeric material;
d) the unit (1) comprises several structurally distinct adjacent modules that are stacked along an axis and each containing a sub-volume, and at least some of the modules individually comprise a bottom separating two adjacent modules transversely to said axis, each bottom corresponding to a said wall where said at least one communication passage allows the liquid to enter and exit, the passages being offset laterally with respect to each other along the axis.

"VIP" refers to an airtight enclosure under partial vacuum (internal pressure ranging from 10 to $10^4$ Pa) containing at least one thermally insulating material that in principle is porous. An alternative may be to replace the vacuum with a gas having a thermal conductivity lower than that of the ambient air (26 mW/m·K). The insulating material may not be porous.

Here, "porous" refers to a material having interstices allowing the passage of air. Open-cell porous materials thus include foams but also fibrous materials (such as glass wool or rock wool). The interstices allowing passage that can be referred to as pores have sizes of less than 1 or 2 mm so as to ensure proper thermal insulation, and preferably of 1 micron, and particularly preferably of $10^{-9}$ m (nano-porous structure), in particular for reasons of resistance to ageing and therefore of possibly less strong negative pressure in the VIP enclosure.

And the above reference to a body of mouldable material will cover both injected thermoplastic resins reinforced with glass fibre and thermosetting resins impregnating a fabric or mat, such as a woven or a non-woven fabric.

If necessary, the various aspects of the invention will be better understood and other characteristics, details and advantages thereof will become apparent upon reading the following description, given by way of non-limiting example and with reference to the annexed drawings (in which possible auxiliaries required for the proper circulation of the fluids are not shown: non-return valves, filters, etc.) and in which:

Figure 1:
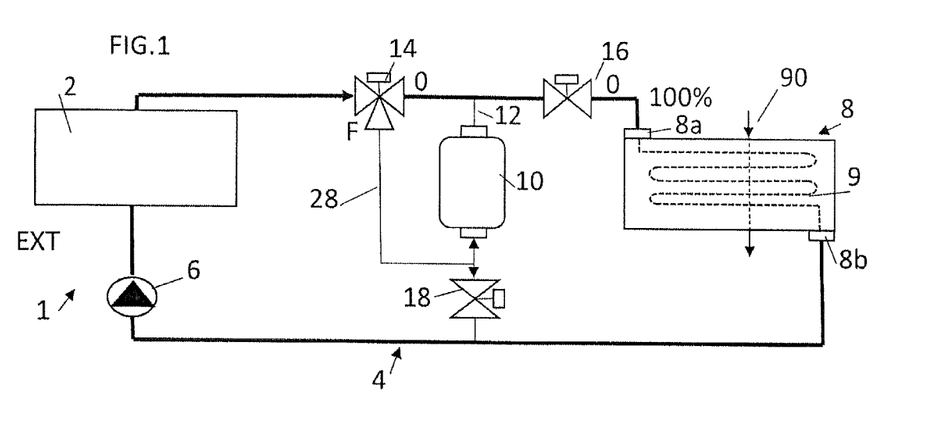
FIGS. 1 to 3, on the one hand, and 4 to 8, on the other hand, show two examples of cooling circuits incorporating a store/exchanger, respectively in series and in parallel, FIGS. 9, 10 schematically show two versions of a store/exchanger, (FIG. 1), with details concerning the element(s) that it consists of, FIG. 11 schematically shows a store/exchanger module laterally surrounded by an active thermal barrier hereafter identified by 15/23, within at least one airtight enclosure.
Figure 2:
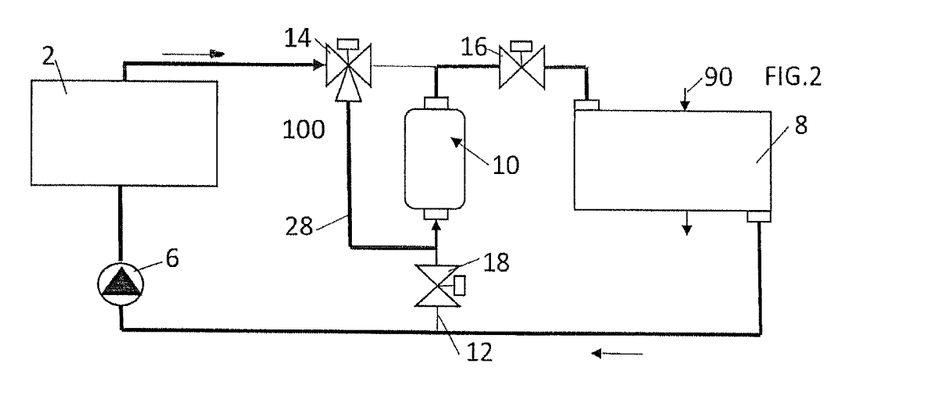
Figure 3:
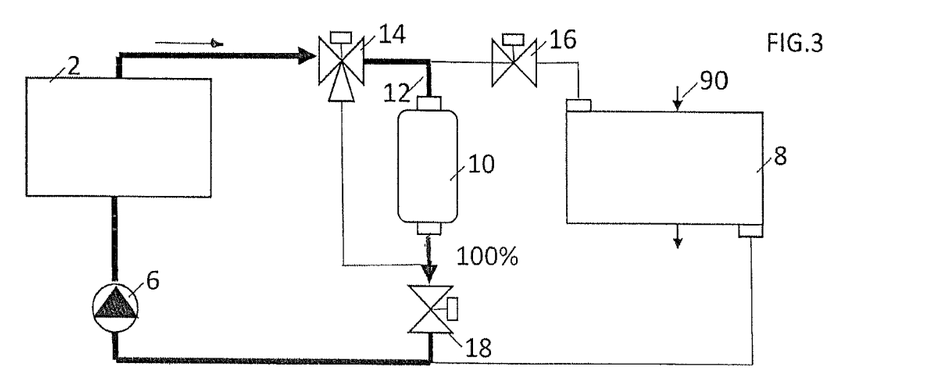

FIGS. 1 to 8 thus illustrate two possible modes of operation Integration of a thermal energy store in a vehicle cooling loop. Two types of integration are therefore possible:

1. Serial Integration; FIG. 1 to 3:

The planned cooling circuit 1 on the vehicle fitted the heat engine 2, for its engine-driven movement, and wherein circulates water in this case, comprising a closed-circuit circulation path 4.

Within it, a means 6 for circulating the liquid, such as a pump, the engine 2, whose engine block is to be cooled by the water circuit, and the radiator 8 (generally an air-liquid exchanger, if not a liquid-liquid exchanger, such as a water-water exchanger) are arranged in series on the basic closed circuit 4a.

While the engine 2 shown in the example is a heat engine, it could also be an electric motor. Therefore, the present solutions are applicable on vehicles with heat engines for movement, on electric vehicles and on hybrid vehicles (with heat engines and electric motors for movement).

In the example shown, the unit 10 for storing and subsequently releasing the previously stored thermal energy is mounted "in parallel" on a first branch 12 between the inlet 8a and the outlet 8b of the radiator, in the direction in which it will allow for the radiator 8 to be bypassed in "discharge" mode), it being specified that this arrangement does not imply an operation that must be "parallel" (see the "charge" mode below).

Valves 14 (three-way) and 16, 18 (two-way) are so positioned as to direct the flow of the liquid arriving from the engine toward the radiator and/or the unit 10. Typically, these will be solenoid valves automatically controlled by software of a remote computer 28. The valves 14, 16 can be on-off valves, the one 14 with variable opening/closing, must be progressive.

In a standard manner, the water coming out of the engine is hot (typically between 70 and 95° C.) and the radiator 9 is used to cool it (between 60 and 75° C.). It will therefore be possible to use this hot water as a heat transfer fluid to store (charge) and then release (discharge) part of the thermal energy it contains via the unit 10.

Figure 7:
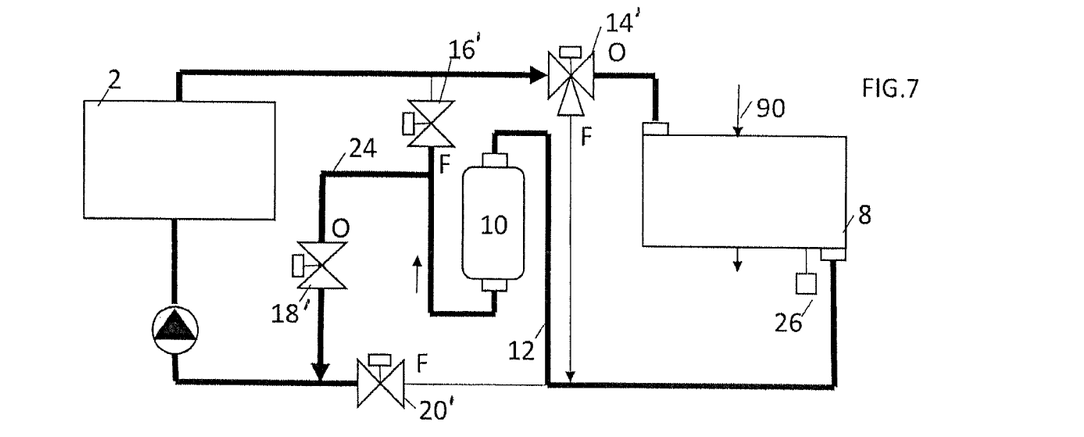
Figure 8:
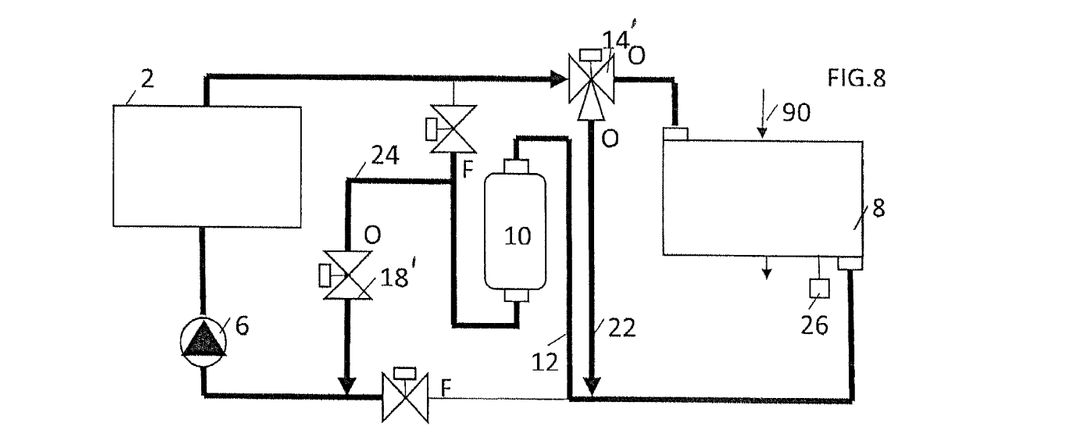
Figure 9:
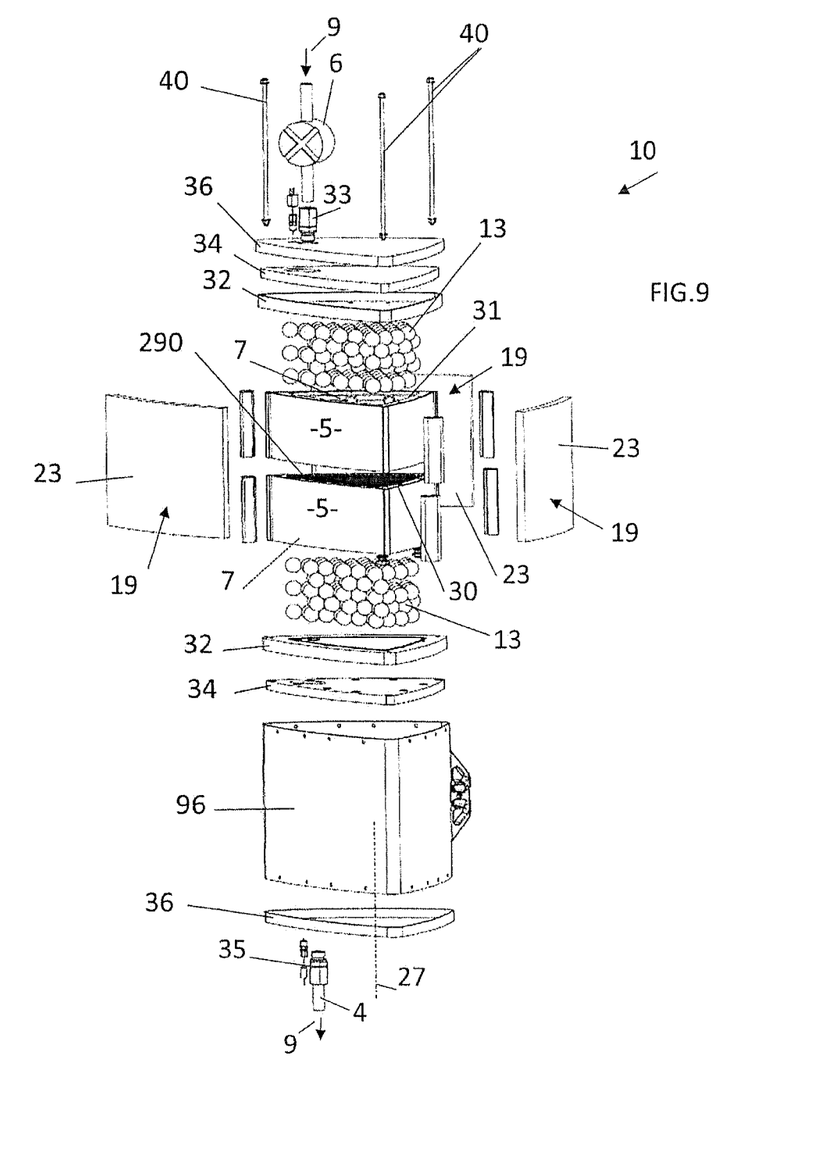
Figure 10:
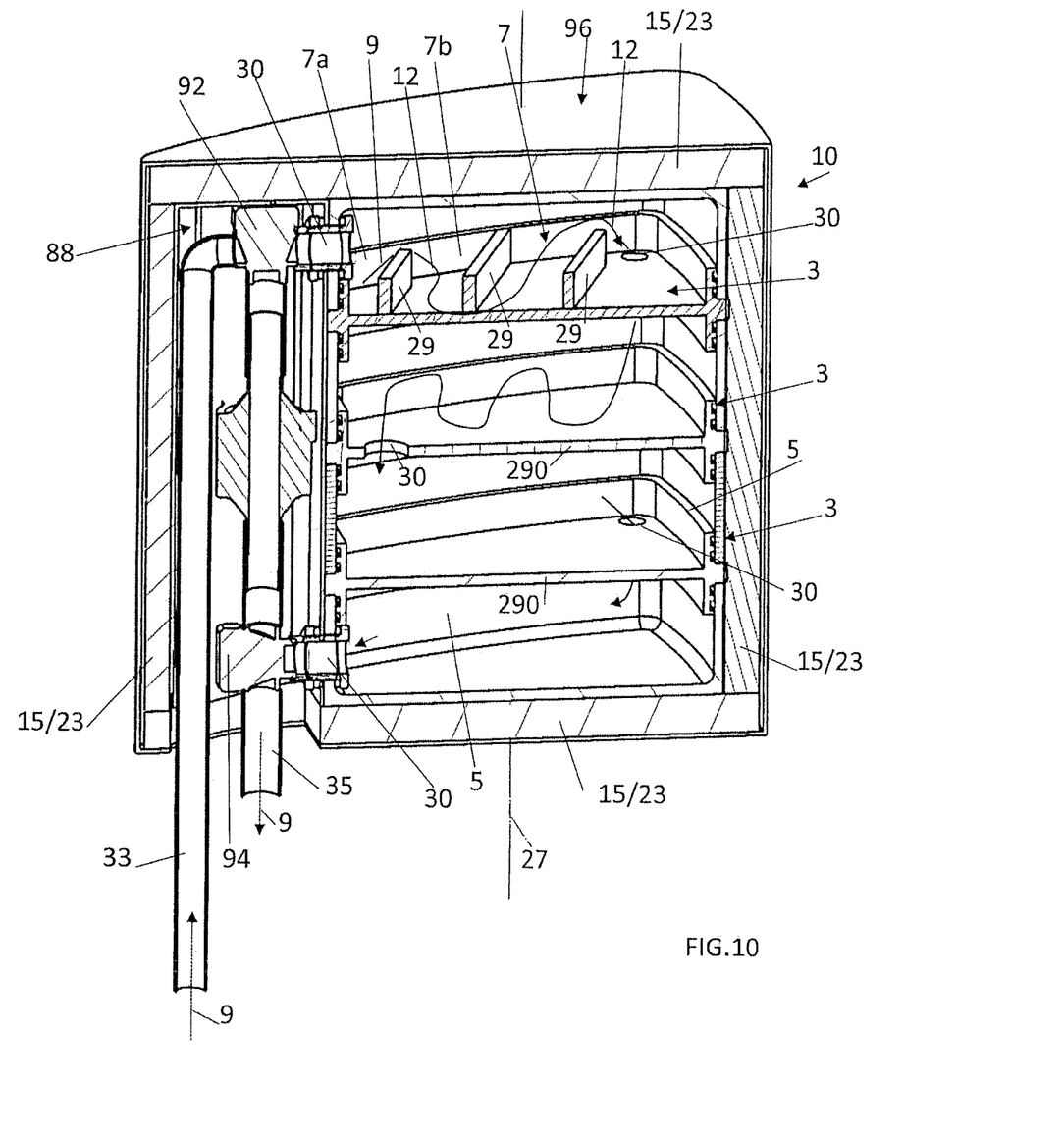
Figure 11:
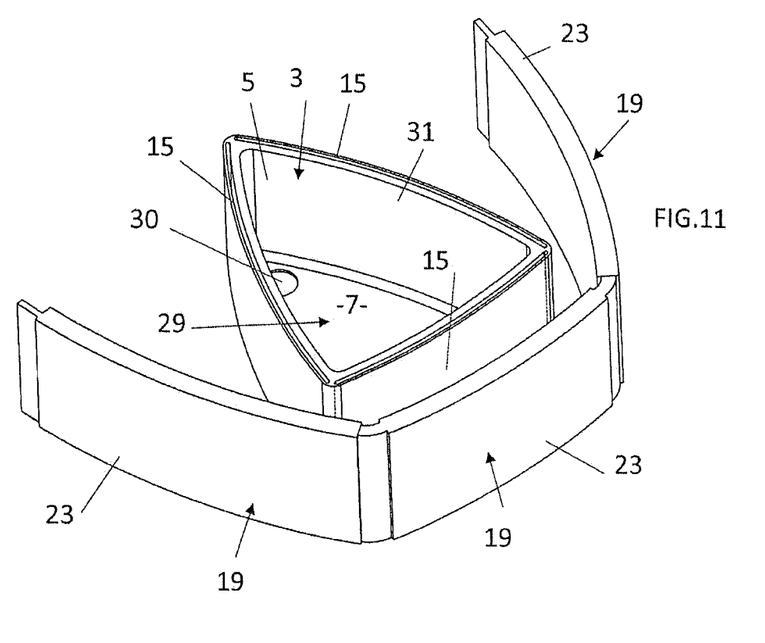

To this end, FIG. 9 to 11 show possible embodiments that may be suitable to ensure the dual function above, these embodiments may also be applied to the parallel assembly shown in FIG. 4 to 8.

In this particular case, the unit 10 contains at least one (here several) volume 7.

Each volume contains elements 13 for storing and releasing energy including phase change material (PCM), placed in a heat exchange relationship with the circulating liquid.

In order to promote latent heat storage ("charge" mode below) via these elements 13, at least some of them (if they include solid-liquid PCM) will favourably have a melting point that is less than or equal to the melting temperature of the PCM(s) of said first layer 15 (this also applies to case 2 below).

At least one first layer 15 containing a PCM and one second layer 23 containing a porous thermally insulating material are installed around each volume.

At the outlet of the engine block 2, the water circulating in it can be led directly to the cooling element (radiator 8). It can also be entirely (100%) or partially deviated to the unit's 10 storage volume(s), to ensure its energy charge.

In NOMINAL mode, as shown in FIG. 1: 0% of the liquid circulating in the circuit 4 flows through the unit 10. However, 100% of this fluid feeds the radiator 8. Valve 18 is closed. Valve 16 is open.

When the unit 10 is in CHARGE mode, as shown in FIG. 2: 0% of the liquid circulates via the radiator 8, whereas 100% of this fluid feeds the unit 10. Valve 18 is closed. Valve 16 is open.

When the unit 10 is in DISCHARGE mode, as shown in FIG. 3: 0% of the liquid circulates via the radiator 8, whereas 100% of this fluid feeds the unit 10. Valve 18 is open. Valve 16 is closed.

Therefore, on the circuit 4:
the first three-way valve 14 is so positioned that the liquid arriving from the engine circulates toward the heat exchanger 8 and/or the unit 10,
and the second two-way valve 16 is so positioned as to allow the liquid to circulate in the radiator when it is open and prevent it from circulating therein when it is closed,
whereas the third two-way valve 18 is so positioned as to achieve the following:
  when the unit 10 is in said calorie-charging state (FIG. 2), circulate the liquid coming from the engine 2 into the unit 10 by closing the return 10a from the branch 10 to the engine thus bypassing the radiator,
  and, when the unit 10 is in said calorie-discharging state (FIG. 3), circulate the liquid coming out of the unit 10 toward the engine 2.

Using the assembly introduced above, the detailed operation is as follows, as illustrated:
In nominal mode and at the outlet of the engine 2, the liquid flows through the first valve 14 and then entirely into the radiator 8, without flowing into the unit 10. The second valve 16 is open and the third valve 18 is closed.

When the unit 10 is in a calorie-charging state, and at the outlet of the engine, the liquid flows through the first valve 14, which directs it exclusively into the unit 10, after which the liquid flows into the radiator 8 and then returns to the engine. The second valve 16 is open and the third valve 18 is closed.

When the unit is in a calorie-discharging state, the liquid flows through the first valve 14 and then entirely into the unit 10 and then returns to the engine 2. The second valve 14 is closed and the third valve 18 is open.

2. Other Integration (Called "Parallel"); FIG. 4 to 8:
In this case, the valves comprise a first three-way valve 14' and second 16', third 18' and fourth 20' two-way valves.

Figure 4:
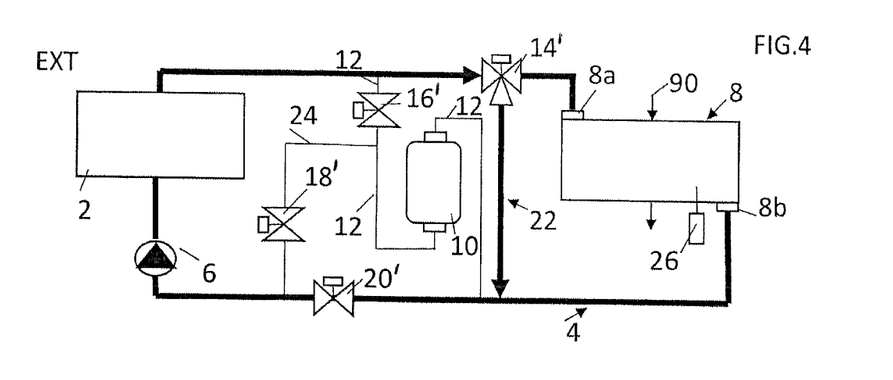

Said first branch 12, which includes the unit 10, also includes the second valve 16'.

With respect to the circulation of the liquid, the connection of the unit 10 to the outlet 8b of the radiator is located downstream of a second branch 22 of the circulation path, which:
is connected to the first valve 14', which is so positioned as to share the flow of liquid coming out of the engine 2 between the radiator 8 and said second branch 22,
and opens downstream of the radiator 8 to allow for it to be bypassed when the first valve 14' is closed toward the radiator and open toward the second branch.

On the basic closed circuit 4a, the first branch 12 thus is connected between a point upstream of the first valve 14' and a point downstream of the connection of the second branch 22, between the outlet of the radiator 8 and the fourth valve 20'.

Furthermore, with respect to the circulation of the liquid, the connection of the unit 10 to the inlet of the radiator is located upstream of the first valve 14' (between it and the outlet of the engine 2) and includes the second valve 16', which is so positioned as to:
when it is in the open state, allow the liquid to circulate into the unit 10, when the first valve 14' is in an open state,
and, when it is in the closed state, prevent any liquid coming out of the unit from returning to the first valve.

A third branch 24 of the circulation path includes the third valve 18' and, on the first branch 10, is connected between the second valve 16' and the unit 10 and a point downstream of the third valve, on the basic circuit 4a.

Thus, when the third valve 18' is in a closed state and the second valve 16' is an open state and when the unit 10 is in a calorie-charging state, the third branch 24 allows the liquid coming out of the second valve to circulate toward said unit.

And, when it is in a closed state, the third valve 18' prevents liquid from directly returning to the engine 2 without flowing through the unit 10 and, when it is in an open state, it allows the liquid to directly return in this way, when the fourth valve 20' is closed.

The assembly of this fourth valve 20' on the basic closed circuit 4a between the downstream connection of the first branch 12 and the engine 2, in fact allows it to achieve the following:
when it is in the open state, allow the liquid to return to the engine, after its passage through the unit 10, when said unit is in the calorie-charging state,
and, when it is in the closed state, prevent the liquid from returning to the radiator 8, the unit 1 or the second branch 22.

With such an assembly, at the outlet of the engine block, the water can be made to circulate both into the unit 10 or into the radiator 8. The unit 10 can be fed with the fluid flowing toward the radiator or with the fluid returning from the radiator.

In NOMINAL mode: 0% of the fluid flows through the unit 10; the valves 16', 18' are closed, whereas, through the first valve, which is open, up to 100% can flow through the radiator 8, from the engine's 2 outlet. The adjustment of the flow rate in the radiator, via the valve 14', depends on the thermal load produced by the engine 2 and thus on the opening of this valve 14'.

Figure 5:
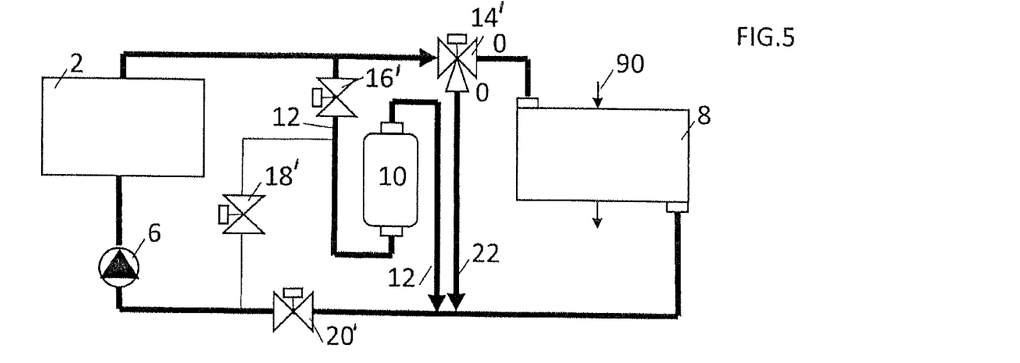

When the unit 10 is in CHARGE mode: the setting of the first valve 14' can be adjusted according to the unit's 10 and the radiator's outlet temperature.

Figure 6:
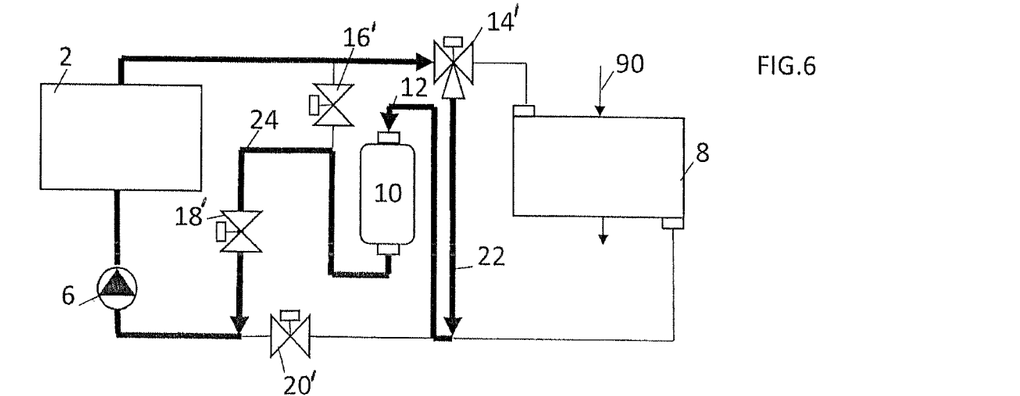

When the unit 10 is in DISCHARGE mode: 0% of the fluid circulates through the radiator, while 100% of the fluid coming from the engine 2, and therefore needing to be cooled, circulates through the bypass (bypass branch) 22 of the radiator. The third valve 18' is open. The second and fourth valves are closed. Controlling these three valves leads to 100% circulating through the unit 10.

Thus, in NOMINAL mode and at the engine's outlet, the liquid will flow through the first valve 14' and then into the radiator, without flowing through the unit 10, the fourth valve 20' being open and the second and third valves 16', 18' being closed.

When the unit is in a calorie-charging state and at the engine's outlet, the liquid will at least in part flow through the second valve 16', which will direct it toward the unit 10, whereas passage through the first valve 14' toward the radiator and into the second branch 22 will be adjusted according to at least one physical parameter in the unit or in the radiator, after which the liquid will return to the engine, the fourth valve 20' being open and the third valve 16' being closed.

Lastly, when the unit 10 is discharging calories, the liquid will flow through the first valve 14', which will direct it exclusively into the unit through the second branch 22, without flowing through the radiator, the fourth valve 20' being closed. Subsequently, the liquid will return to the engine 2, the second valve 16' being closed and the third valve 18 being open.

As the physical parameter used to adjust the passage through the first valve 14' in the charging state, we recommend choosing a temperature, preferably the radiator outlet temperature, which can be read by a sensor 26 connected to the computer 28.

Thus, particularly in nominal mode, the first valve 14' will share the flow of liquid coming out of the engine 2 between the radiator and the second branch 22 according to the temperature data related to the radiator.

Moreover, as mentioned above, the assembly according to this "parallel" integration shown in FIGS. 4 to 8 will make it possible to handle, in nominal mode, the situation where a power issue will occur on the radiator 8, following a thermal overload detected by a temperature sensor, such as sensor 26 (e.g. a temperature above 75° C.).

In this case, the fourth valve 20' will close and the third valve 18' will open, to then ensure that the liquid circulates into the unit 10 after flowing through the radiator 8 (see FIG. 7).

100% of the flow rate may again be made to circulate into the unit, wherein one could then provide dedicated PCM elements 13 (thus complementary to those mentioned above having a lower melting temperature) having a higher melting temperature than that of the PCM(s) of the layer 15, for example a melting temperature of 90° C. rather than the 70/75° C. of the other elements in the layer 15, thus allowing for a temperature peak to be cancelled out.

Then, once the temperature sensor has detected the end of the thermal overload (e.g. a temperature of less than 70° C.), the first valve 14' will again share the flow of liquid coming out of the engine between the radiator 8 and said second branch 22, while it had directed the liquid exclusively to the radiator 8, thus without flowing through the second branch, after the thermal overload had been detected by the temperature sensor 26 (see FIG. 8). The nominal mode can then be restored.

Regarding the structure of the unit 10, reference may be made to the preferred examples in FIGS. 9 to 11.

The diagram of FIG. 9 shows a thermal device or unit 10 into which and out of which flows a fluid 9 (heat transfer fluid in the application for the cooling circuit), its circulation being handled by circulation means 6, such as a pump.

The heat store-exchanger 10 installed in the circuit 4 therefore is a unit that will store thermal energy through phase change(s) of at least one PCM, and then subsequently release at least part of this energy by additional phase change(s) (of at least some) of this (these) PCM(s).

The unit 10 thus includes one or several modules 3 each enclosing an internal volume 7 in which the fluid 9 circulates and in which PCM elements 13 for storing and releasing thermal energy are placed in contact with the fluid to enable heat exchanges.

As shown in FIG. 10, the (each) interior volume 7 will be favourably provided with baffles. In order to define them, a series of walls 29 may be provided along the fluid path: splitting the volume 7 into a succession of sub-volumes, such as 7a, 7b, 7c, etc. in which the elements 13 will be arranged in batches around and/or in which the fluid will circulate in heat exchange relationships,
and having at least one communication passage 30 between the sub-volumes.

Each module can be opened at 31 and closed through a bottom 290.

In the direction 27 in which the modules 3 are lying upon another, on either side of the stack that they form, a cover 32 will then close each opening 31 and may be doubled up with a pocket 34 in the form of a VIP. A mechanical protection plate 36 may close the whole, along the axis 27, as shown. In this location, fastening means 40, which may be tie rods, mechanically fasten the modules together along the axis 27.

For purposes of readability, FIGS. 10, 11 do not show the elements 13. These can be seen in FIG. 9. They can be spheres or ovoids.

FIG. 10 makes it clear that the baffles 12 can be formed by the fact that the walls 29 are in this case bottoms of bodies or modules 3, which are arranged in line (direction 27), one after the other, communicating two by two through a passage 30 formed in each bottom 29.

Each module 3 consists of a lateral peripheral wall 5 that completes the pierced bottom 290. Each transverse wall 290 and its through-passage 30 thus form a retarder to the free flow of fluid between its inlet 33 and its outlet 35. Preferably, two passages 30 of successive modules will be offset laterally, with respect to the axis 27 as shown schematically. Opposite the bottom, each module is open, at 31, in such a way that, when coming out of a passage 30, the fluid directly arrives in the internal volume of the adjacent module. The circulation between sub-volumes within the unit can be in series or in parallel.

In addition, a housing 96 (in this case closed on all sides) is arranged around the modules, which provides mechanical protection and gathers the modules together. The unit 10 may only include a single module 3. Each module shown in FIG. 9 can be the one shown in FIG. 10 or 11, which includes the additional elements 13.

In a module of the solution shown in FIG. 10, the baffles 12 are (essentially) created by the internal walls 29 which, within the space 7 delimited by the peripheral wall 5 and the pierced bottom 290, split this space into sub-volumes 7a, . . . 7c. Each wall 29 being interrupted at one of its lateral ends before reaching the wall 5, this is where one of the passages 30 is defined which, in connection with the wall in question and preferably an alternation at the lateral end thus opened, forms a baffle. The arrows in FIG. 10 show the meandering fluid.

In each case, a rubber compound as described in EP2690137 or in EP2690141 may be provided as a structure of elements 13, i.e. in the second case a cross-linked compound based on at least one room temperature vulcanized (RTV) silicone elastomer and comprising at least one phase change material (PCM), said at least one silicone elastomer having a viscosity measured at 25° C. according to standard ISO 3219 that is less than or equal to 5000 mPa·s. The thermal phase change material (PCM) may consist of n-hexadecane, eicosane or a lithium salt, all having melting points below 40° C. Alternatively, the PCM could be based e.g. on fatty acid, paraffin, or eutectic or hydrated salt, or even fatty alcohols.

Around the/each volume 7, an active thermal barrier (15/23) provides a thermal insulation with respect to the outside and at least one retarding function in the transmission of thermal energy between the inside and outside of the unit.

Figure 12:
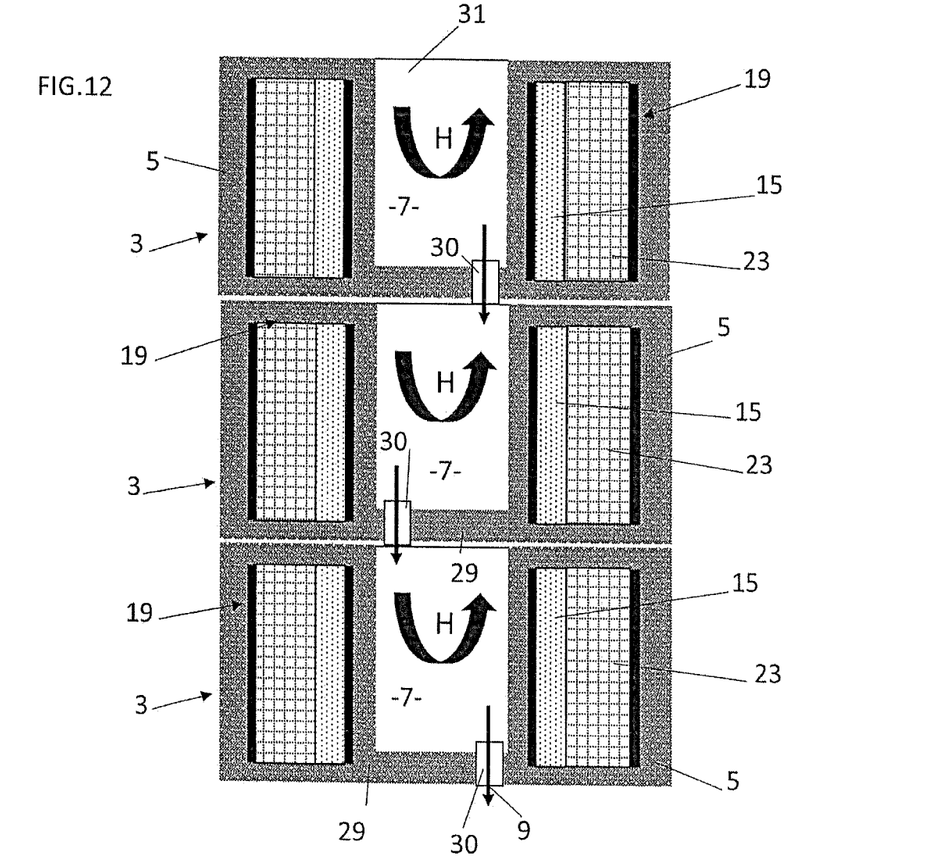
FIG. 12 schematically shows a vertical section of three store/exchanger modules, lying upon another and incorporating an active thermal barrier in their side wall, each module being moulded.

This active thermal barrier must be either of the following:

integrated in whole or in part to the lateral peripheral wall 5 (as shown in FIG. 12, for the two layers 15/23 embedded in the wall, or in FIG. 11 where the layer 15 is arranged in slots in the wall), arranged around the wall 5 (FIGS. 9, 10 and also 11 for the layer 23).

The barrier must therefore comprise at least one first layer 15 containing a PCM and one second layer 23 containing a thermally insulating material. In principle, the second layer 23 must be arranged around the first layer 15.

The thermal barrier is sensitive to heat exchanges in the overall volume 7, but has no physical contact with the liquid 9 (which circulates within the PCM elements 13). They are separated at least by part of the thickness of the peripheral wall 5.

In order to optimize the thermal efficiency of the active barrier, we recommend that it includes at least one VIP forming a pocket 19 under vacuum wherein at least the second layer 23, which preferably will coexist with the PCM layer 15 within the same airtight enclosure.

The sheet(s) or film(s) forming each pocket may typically be embodied as a multilayer film comprising polymer films (PE and PET) and aluminum in the form of, for example, laminated (sheet of thickness in the order of ten micrometre) or metallized (vacuum deposition of a film of a few tens of nanometres).

The material of the layer 23 will favourably consist of a porous material (if an air gap is to be achieved), such as a silica powder or an aerogel, confined in a deformable or conformable sheet that is impervious to water vapour and gases. The VIP obtained will be emptied of the air it contains to obtain a pressure of e.g. a few millibars and can then be sealed. Typically, the thermal conductivity $\lambda$ of such a VIP will be 0.004/0.008 W/m·K. Examples of VIPs and of super-insulating material that may apply here are provided in PCT/FR2014/050267 and WO2014060906 (porous material), respectively.

The solutions presented above will favourably enable, in a volume and weight acceptable among others by aircraft or automotive manufacturers, quick storage of the available thermal energy after about 6 to 10 minutes, retention of this energy for 12 to 15 hours, before its quick release, typically within a few minutes (in particular less than 2 or 3).

The invention claimed is:

1. A temperature management system on a vehicle cooling circuit of a vehicle, the vehicle being disposed in an outside environment, the vehicle cooling circuit comprising a circulation path for circulating a heat transfer liquid and, arranged on the circulation path:

liquid circulation means for circulating the heat transfer liquid along the circulation path, an engine for moving the vehicle, the engine having components adapted and arranged to be in a thermal exchange with the heat transfer liquid received from the liquid circulation means, and a heat exchanger having an inlet configured to receive the heat transfer liquid output from the engine and to place the received heat transfer liquid in a heat exchange with another fluid in thermal contact with the heat exchanger and an outlet for providing said heat transfer liquid to the liquid circulating means;

a heat storing unit having an inlet and an outlet, one of the inlet and the outlet of the heat storing unit coupled between the engine and the inlet of the heat exchanger, and the other of the inlet and the outlet of the heat storing unit coupled between the outlet of the heat exchanger and the liquid circulation means, and valves positioned to allow the heat transfer liquid arriving from the engine to flow toward the heat exchanger and/or the heat storing unit, the heat storing unit being a latent heat unit adapted to store thermal energy, in a calorie-charge state, and release a thermal energy, in a calorie-discharge state, the latent heat unit:

containing a volume having an inlet to allow the heat transfer liquid to enter and an outlet to allow the heat transfer liquid to exit, containing a phase change material adapted to be in a thermal exchange with said heat transfer liquid, and comprising a thermal barrier surrounding both the volume and the phase change material, and containing a thermally insulating material adapted to thermally isolate said volume and said phase change material from the outside environment, wherein the valves comprise:

a first three-way valve so positioned on the circulation path and controlled as to allow the heat transfer liquid to circulate either toward the heat exchanger or toward said latent heat unit, a second two-way valve so positioned on the circulation path and controlled as to allow the heat transfer liquid to circulate in the heat exchanger when the second two-way valve is open and prevent the heat transfer liquid from circulating in the heat exchanger when the second two-way valve is closed, a third two-way valve so positioned on the circulation path and controlled as to:

allow said heat transfer liquid arriving from the engine to circulate into the latent heat unit, and prevent a direct return to the engine of said heat transfer liquid leaving the latent heat unit, when the heat transfer liquid circulates at a first determined temperature or when the heat transfer liquid circulates at a temperature that falls within a first determined temperature range, and allow said heat transfer liquid arriving from the latent heat unit to circulate toward the engine, with no circulation in the heat exchanger, when the heat transfer liquid circulates at a second determined temperature or second determined temperature range.

2. The system of claim 1, wherein the first three-way valve, second two-way valve and third two-way valve are controlled by means of a temperature sensor which detect the temperature of the heat transfer liquid in the circulation path.

3. The system of claim 1, wherein the first three-way valve, second two-way valve and third two-way valve are positioned on the vehicle cooling circuit and controlled in such a way that:

in a nominal mode, in which the heat transfer liquid circulates at a third determined temperature or in which the heat transfer liquid circulates at a temperature that falls within a third determined temperature range, said heat transfer liquid arriving from the engine is allowed to flow into the thermal exchanger without flowing into the heat latent unit and then return to the engine, when the heat transfer liquid arrives from the engine at the first determined temperature or when the heat transfer liquid arrives from the engine at a temperature that falls within the first determined temperature range, and the phase change material is in the calorie-charging state that allows the phase change material to store calories from the heat transfer liquid, said heat transfer liquid being allowed to at least partly flow into said heat latent unit and into the thermal exchanger and then return to the engine, and when the heat transfer liquid circulates at the second determined temperature or when the heat transfer liquid circulates at a temperature that falls within the second determined temperature range, and the phase change material is in the calorie-discharging state that allows the phase change material to discharge calories into the heat transfer liquid, said heat transfer liquid arriving from the engine being allowed to flow into the heat latent unit, without flowing through the heat exchanger, and then return to the engine.

4. A temperature management system on a vehicle circuit, in a vehicle disposed in an outside environment, the vehicle circuit comprising a circulation path for circulating a fluid and, arranged on the circulation path:

fluid circulation means for circulating the fluid along the circulation path, an engine for moving the vehicle, the engine having components adapted and arranged to be in a thermal energy exchange with the fluid received from the fluid circulation means, and a thermal exchanger having an inlet configured to receive the fluid output from the engine and to place the received fluid in a heat exchange with another fluid in thermal contact with the heat exchanger and an outlet for providing said fluid to the fluid circulating means, a latent energy unit having an inlet and an outlet, one of the inlet and the outlet of the latent energy unit coupled between the engine and the inlet of the heat exchanger, and the other of the inlet and the outlet of the latent energy unit coupled between the outlet of the heat exchanger and the fluid circulation means, and valves positioned and controlled to allow the fluid arriving from the engine to flow toward the thermal exchanger and/or the latent energy unit, the latent energy unit having an inlet and an outlet to allow said fluid to circulate therein, the latent energy unit:

containing a volume which is in fluid communication with said inlet and said outlet of the latent energy unit, to allow the fluid to circulate therein, and, in which a phase change material is disposed and arranged to be in a thermal exchange with said fluid when circulating in the volume, to store or release a thermal energy, wherein the valves are positioned on the vehicle circuit and controlled in such a way to allow the fluid arriving from the engine:

to at least partly flow into said latent heat unit, then into the thermal exchanger and then return to the engine, when the fluid circulates at a first determined temperature or when the fluid circulates at a temperature that falls within a first determined temperature range and the phase change material is in a thermal energy-storing state in which the phase change material is ready to store thermal energy, so that the thermal energy contained in said fluid is then allowed to be stored in the phase change material, to flow into the latent energy unit, without flowing through the heat exchanger, and then return to the engine, when the fluid circulates at a second determined temperature or when the fluid circulates at a temperature that falls within a second determined temperature range and the phase change material is in a thermal energy-releasing state in which the phase change material is ready to release thermal energy, so that the thermal energy is then allowed to be released by the phase change material into the fluid, and to flow into the thermal exchanger without flowing into the heat latent storing unit and then return to the engine, in a nominal mode in which the fluid circulates at a third determined temperature or when the fluid circulates at a temperature that falls within a third determined temperature range wherein the valves comprise:

a first three-way valve so positioned on the circulation path and controlled as to allow the fluid to circulate either toward the thermal exchanger or toward said latent energy unit, a second two-way valve so positioned on the circulation path and controlled as to allow the fluid to circulate in the thermal exchanger when the second two-way valve is open and prevent the fluid from circulating in the thermal exchanger when the second two-way valve is closed, and a third two-way valve so positioned on the circulation path and controlled as to:

allow said fluid arriving from the engine to circulate into the latent energy unit, and prevent a direct return of said fluid to the engine, when the fluid circulates at the first determined temperature or when the fluid circulates at a temperature that falls within a first determined temperature range, and allow said fluid arriving from the latent energy unit to freely circulate toward the engine, with no flowing through the heat exchanger, when the fluid circulates at the second determined temperature or when the fluid circulates at a temperature that falls within a second determined temperature range.

5. The temperature management system of claim 4, wherein, when the third two-way valve allows said fluid arriving from the engine to circulate into the latent energy unit, the third two-way valve prevents any return of said fluid to the engine without circulation of the fluid into the latent energy unit.

6. The temperature management system of claim 4, further comprising a thermal barrier surrounding both the volume and the phase change material, the thermal barrier comprising a thermally insulating material adapted to thermally isolate said volume and said phase change material from the outside environment.

7. The temperature management system of claim 4, wherein, when the third two-way valve allows said fluid arriving from the engine to circulate into the latent energy unit, the thermal exchanger is bypassed.

8. The system of claim 5, wherein the first three-way valve, second two-way valve and third two-way valve are controlled by means of a temperature sensor which detect the temperature of the fluid in the circulation path.

* * * * *